United States Patent
El Gamal et al.

(10) Patent No.: US 9,531,522 B2
(45) Date of Patent: Dec. 27, 2016

(54) SYSTEM AND METHOD FOR PROACTIVE RESOURCE ALLOCATION

(76) Inventors: Hesham El Gamal, Dublin, OH (US);
John Tadrous, Columbus, OH (US);
Atilla Eryilmaz, Dublin, OH (US)

( * ) Notice: Subject to any disclaimer, the term of this patent is extended or adjusted under 35 U.S.C. 154(b) by 229 days.

(21) Appl. No.: 13/876,653

(22) PCT Filed: Sep. 28, 2011

(86) PCT No.: PCT/US2011/053740
§ 371 (c)(1),
(2), (4) Date: Sep. 18, 2013

(87) PCT Pub. No.: WO2012/050912
PCT Pub. Date: Apr. 19, 2012

(65) Prior Publication Data
US 2014/0016575 A1    Jan. 16, 2014

Related U.S. Application Data

(60) Provisional application No. 61/387,245, filed on Sep. 28, 2010.

(51) Int. Cl.
*H04L 5/00* (2006.01)
*H04W 16/00* (2009.01)
(Continued)

(52) U.S. Cl.
CPC ............ *H04L 5/0064* (2013.01); *H04W 16/00* (2013.01); *H04B 7/2656* (2013.01); *H04W 4/00* (2013.01);
(Continued)

(58) Field of Classification Search
CPC ....... H04B 7/2656; H04W 4/00; H04W 16/00; H04W 28/02; H04W 28/08; H04W 72/0453; H04L 5/0064
See application file for complete search history.

(56) References Cited

U.S. PATENT DOCUMENTS

| | | | |
|---|---|---|---|
| 5,619,274 A * | 4/1997 | Roop et al. | 348/461 |
| 6,243,755 B1 * | 6/2001 | Takagi | H04L 12/2602 709/201 |

(Continued)

FOREIGN PATENT DOCUMENTS

| KR | 10-2008-0018013 A | 2/2008 |
|---|---|---|
| KR | 10-2009-0085589 A | 8/2009 |
| KR | 10-2010-0084512 A | 7/2010 |

*Primary Examiner* — Ian N Moore
*Assistant Examiner* — Latresa McCallum
(74) *Attorney, Agent, or Firm* — Standley Law Group LLP

(57) ABSTRACT

A system and method for allocating resources in a network is disclosed. The system and method comprises a proactive resource allocation framework in which the predictability of user behavior is exploited to balance the network traffic over time and to reduce the bandwidth required to achieve a given blocking/outage probability. The disclosed proactive resource allocation framework avoids limitations associated with off-peak demand and achieves a significant reduction in the peak to average demand ratio without relying on out of network users. It is based on a model in which smart devices are assumed to predict the arrival of new requests and submit them to the network T time slots in advance. Using tools from large deviation theory, the resulting prediction diversity gain is quantified to establish that the decay rate of the outage event probabilities increases linearly with the prediction duration T.

13 Claims, 6 Drawing Sheets

(51) Int. Cl.
 *H04B 7/26* (2006.01)
 *H04W 4/00* (2009.01)
 *H04W 28/02* (2009.01)
 *H04W 28/08* (2009.01)
 *H04W 72/04* (2009.01)

(52) U.S. Cl.
 CPC ............ *H04W 28/02* (2013.01); *H04W 28/08* (2013.01); *H04W 72/0453* (2013.01)

(56) References Cited

U.S. PATENT DOCUMENTS

| | | | |
|---|---|---|---|
| 6,324,570 B1 * | 11/2001 | Tonchev | H04L 47/10 709/207 |
| 6,802,064 B1 * | 10/2004 | Yao | G06F 3/0611 710/40 |
| 7,403,994 B1 * | 7/2008 | Vogl | G06Q 10/06 370/230 |
| 7,565,489 B2 * | 7/2009 | Mullender | G06F 17/30902 711/118 |
| 7,716,425 B1 * | 5/2010 | Uysal | G06F 12/0862 711/137 |
| 8,169,960 B2 | 5/2012 | Bourlas | |
| 8,312,229 B2 | 11/2012 | Bloks | |
| 8,423,853 B2 | 4/2013 | Bourlas et al. | |
| 8,452,745 B2 * | 5/2013 | Ramakrishna | G06F 17/30864 707/705 |
| 2004/0029591 A1 * | 2/2004 | Chapman et al. | 455/452.1 |
| 2004/0117577 A1 * | 6/2004 | Bloks | G06F 9/4887 711/167 |
| 2008/0123520 A1 | 5/2008 | Ji et al. | |
| 2009/0248858 A1 * | 10/2009 | Sivasubramanian et al. | 709/224 |
| 2009/0287750 A1 * | 11/2009 | Banavar | H04L 29/06 |
| 2010/0172306 A1 | 7/2010 | Gill et al. | |
| 2011/0276766 A1 * | 11/2011 | Fullerton et al. | 711/149 |
| 2011/0316723 A1 * | 12/2011 | Wohlert | G06Q 10/10 341/20 |
| 2012/0180101 A1 | 7/2012 | Davis et al. | |

* cited by examiner

SYSTEM AND METHOD FOR PROACTIVE RESOURCE ALLOCATION

CROSS-REFERENCE TO RELATED APPLICATIONS

This application claims priority to U.S. Provisional Patent Application No. 61/387,245 filed on Sep. 28, 2010, which is incorporated herein by reference.

FIELD OF THE INVENTION

The present invention relates to network traffic management. In particular, the present invention relates to a system and method for resource allocation in wireless or wired networks.

BACKGROUND OF THE INVENTION

Ideally, wireless networks should be optimized to deliver the best Quality of Service (in terms of reliability, delay, and throughput) to subscribers with the minimum expenditure in resources. Such resources include transmitted power, transmitter and receiver complexity, and allocated frequency spectrum. Over the last few years, there has been an ever increasing demand for wireless spectrum resulting from the adoption of throughput hungry applications in a variety of civilian, military, and scientific settings. Because the available spectrum is non-renewable and limited, this demand motivates the need for efficient wireless networks that maximally utilize the spectrum. Although there is a severe shortage in the spectrum, it is well-documented now that a significant fraction of the available spectrum is under-utilized [1]. This, in fact, is the main motivation for the cognitive networking framework where secondary users are allowed to use the spectrum in the off time, where the primary users are idle, in an attempt to maximize the spectral efficiency [2]. Unfortunately, the cognitive radio approach is still facing significant regulatory and technological hurdles [3], [4] and, at best, offers only a partial solution to the problem.

This limitation of the cognitive radio approach is intimately tied to the main reason behind the under-utilization of the spectrum; namely the large disparity between the average and peak traffic demand in the network. As an example, in a typical cellular network, one can easily see that the traffic demand in the peak hours is much higher than that at night, which inspires the different rates offered by cellular operators. Now, the cognitive radio approach assumes that the secondary users will be able to utilize the spectrum in the off-peak times but, unfortunately, at those particular times one may expect the secondary traffic characteristics to be similar to that of the primary users (e.g., at night most of the primary and secondary users are expected to be idle).

In the traditional approach, wireless networks are constructed assuming that the subscribers are equipped with dumb terminals with very limited computational power. It is obvious that the new generation of smart devices enjoy significantly enhanced capabilities in terms of both processing power and available memory. Moreover, according to Moore's law predictions, one should expect the computational and memory resources available at the typical wireless device to increase at an exponential rate. This observation should inspire a similar paradigm shift in the design of wireless networks whereby the capabilities of the smart wireless terminals are leveraged to maximize the utility of the frequency spectrum, a non-renewable resource that does not scale according to Moore's law.

The introduction of smart phones has resulted in a paradigm shift in the dominant traffic in mobile cellular networks. While the primary traffic source in traditional cellular networks was real-time voice communication, one can argue that a significant fraction of the traffic generated by the smart phones results from non-data-requests (e.g., file downloads). This feature allows for more degrees of freedom in the design of a scheduling algorithm.

There is a need for a new approach to the resource allocation aspect of the problem and a new paradigm that offers spectral gains in a variety of relevant scenarios. More specifically, there is a need for a proactive resource allocation framework that exploits the predictability of daily usage of wireless devices to smooth out the traffic demand in the network, and hence, reduce the required resources to achieve a certain point on the Quality of Service (QoS) curve.

SUMMARY OF THE INVENTION

The disclosed system and method comprises a proactive resource allocation framework in which the predictability of user behavior is exploited to balance the network traffic over time, and hence, significantly reduce the bandwidth required to achieve a given blocking/outage probability. The disclosed proactive resource allocation framework avoids limitations associated with off-peak demand, and hence, achieves a significant reduction in the peak to average demand ratio without relying on out of network users. It is based on a simple model in which smart devices are assumed to predict the arrival of new requests and submit them to the network T time slots in advance. Using tools from large deviation theory, the resulting prediction diversity gain is quantified to establish that the decay rate of the outage event probabilities increases linearly with the prediction duration T. This model is then generalized to incorporate the effect of prediction errors and the randomness in the prediction lookahead time T. In the cognitive networking scenario, the appropriate use of proactive resource allocation by the primary users results in more spectral opportunities for the secondary users at a marginal, or no, cost in the primary network outage.

In alternative embodiments, functionality is provided on smart devices and/or at servers. The allocation techniques may be adapted for use in wired as well as wireless networks.

DETAILED DESCRIPTION

Usage of wireless devices is highly predictable. This claim is supported by a growing body of evidence that range from the recent launch of Google Instant to the interesting findings on predictable mobility patterns [5]. In this context, a relevant example is the fact that preference for a particular news outlet is not expected to change frequently. So, if the smart phone observes that the user is downloading CNN, for example, in the morning for a sequence of days in a row then it can safely anticipate that the user will be interested in the CNN again the following day. Coupled with the fact that the most websites are refreshed at a relatively slow rate, as compared with the dynamics of the underlying wireless network, one can now see the potential for scheduling early downloads of the predictable traffic to reduce the peak to average traffic demand by maximally exploiting the available spectrum in the network idle time.

It is important to observe here the temporal and spatial scales at which this predictability phenomenon exhibits itself. First, there is a growing body of evidence that behavioral patterns can be accurately predicted at the single user level. On the temporal scale, the requests are largely predictable at the scale of the application layer (e.g., minutes and hours) which is much slower than the dynamics of the physical, medium access, and network layers. This property is a key enabler for exploiting capacity enhancing techniques that introduce delays at the same time scale.

The disclosed system and method improves the spectral efficiency of wireless or wired networks through the judicious exploitation of the predictable behavior of users. More specifically, in the current paradigm, traffic requests are considered urgent, at the time scale of the application layer, and hence, have to be served upon initiation by the network users in order to satisfy the required QoS metrics. However, if the user devices can predict the requests to be generated by the corresponding users and submit them in advance, then the network has the flexibility in scheduling these requests over an expanded time horizon as long as the imposed deadlines are not violated. When a predictive network serves a request before its deadline, the corresponding data is stored in cache memory of the user device and, when the request is actually initiated, the application pulls the information directly from the memory instead of accessing the network. It is worth noting that not all applications, although predictable, can be served prior to their time of initiation. For example, some multimedia traffic may be predictable, but can only be served on a real-time basis as they are based on live interactions between users. However, predicting these types of requests can still be considered an advantage, as the network may schedule other non-real-time requests while taking into account the predicted real-time requests in a way that enhances the QoS of all applications.

Figure 1:
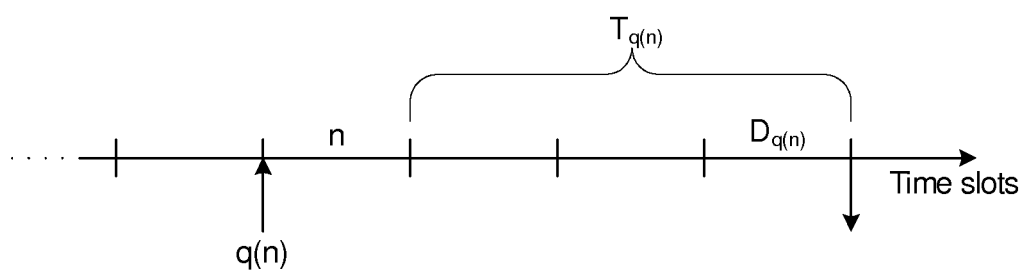
FIG. 1 is an illustration of a prediction model.

Unless otherwise stated, a simplified model of a single cell slotted wireless network where the aggregate requests are allowed to arrive only at the beginning of each slot is used. The number of arriving requests at time slot $n>0$ is denoted by $Q(n)$ which is assumed to be ergodic and to follow a Poisson distribution with rate $\lambda$. All requests are assumed to have the same amount of required resources which is taken to be unity. That is, each request has to be totally served in a single slot by consuming one unit of resource. Moreover, the wireless network has a fixed capacity C per slot. Furthermore, it is assumed that a predictive wireless network can anticipate the arrival of each request by an integer number of time slots in advance. That is, if $q(n)$, $1 \leq q \leq Q(n)$, is the ID of a request predicted at the beginning of time slot n, the predictive network has the capability of serving this request no later than the next $T_{q(n)}$ slots. Hence, when a request $q(n)$ arrives at a predictive network, it has a deadline or expiration time at time slot $D_{q(n)}=n+T_{q(n)}$ as shown in the prediction model of FIG. 1.

In the non-predictive network, all arriving requests at the beginning of time slot n have to be served in the same time slot n, i.e., if $q(n)$ is a non-predicted request, its deadline or expiration time is $D_{q(n)}=n$ meaning that $T_{q(n)}=0$. It is assumed that an outage event occurs at a certain time slot if and only if at least one of the requests in the system expires in this slot. The model operates as the time scale of the application layer at which: 1) the current paradigm, i.e., non-predictive networking, treats all the requests as urgent; 2) each slot duration is in the order of minutes and possibly hours; and 3) the system capacity is fixed because the channel fluctuation dynamic are averaged out at this time scale.

The probability of outage, P(outage), is the performance metric under a scaling regime whereby $\lambda$ and C increase such that the ratio $$\frac{\log(\lambda)}{\log C}$$

is kept at a constant value $\gamma$, $0 \leq \gamma \leq 1$. In other words, $\lambda$ is scaled as $C^\gamma$ for each choice of $\gamma$. Under this assumption, the diversity gain is defined as $$d(\gamma) \triangleq \lim_{C \to \infty} \frac{-\log P(\text{outage})}{C \log C} \qquad (1)$$

for both the non-predictive and predictive networks.

The diversity gain for the two networks when both witness the same arrival process is $Q(n)$, $n>0$ per slot. The difference is in only the deadlines of the arriving requests. The deadline for a request $q(n)$ is slot n when the network is non-predictive, and is $n+T_{q(n)}$ when the network is predictive with $T_{q(n)}=1, 2, \ldots$. In general, as the system capacity C grows, the outage probability is expected to decrease. Tools of large deviation theory [6], [7] may be used to characterize $d(\gamma)$, which quantifies the achievable diversity-multiplexing tradeoff, in different scenarios. The following result determines the prediction diversity gain for the deterministic look-ahead time case, i.e., $T_{q(n)}=T \ \forall q(n)$.

Theorem 1.

The diversity gain of proactive scheduling for the above model with T-slot prediction equals $$d_P(\gamma)=(1+T)(1-\gamma).$$

Noting that the diversity gain of the non-predictive scenario is obtained as a special case by setting T=0, i.e., $d_N(\gamma)=(1-\gamma)$, this result reveals that proactive scheduling offers a multiplicative gain of $(1+T)$ in the achievable diversity advantage.

Proof.

Start with the non-predictive benchmark corresponding to T=0. In this case, the outage probability in any slot n corresponds to the event $\{Q(n)>C\}$, which can be expressed as $$P_N(\text{outage}) = \sum_{k=C+1}^{\infty} \frac{(C^\gamma)^k}{k!} e^{-C^\gamma}. \qquad (2)$$

For large values of C, tightest Chernoff bound [6] can be used to upper bound the outage probability as $$P_N(\text{outage}) \leq e^{C-C^\gamma-(1-\gamma)C \log C} \qquad (3)$$

Furthermore, from (2), it is obvious that $$P_N(\text{outage}) \geq \frac{C^{\gamma(C+1)}}{(C+1)!} e^{-C^\gamma}, \qquad (4)$$

Hence, by taking the log of the upper and lower bounds on $P_N$(outage) in (3), (4) and dividing by $-C \log C$ it follows directly that the diversity gain of the non-predictive network is equal to $$d_N(\gamma) = 1 - \gamma. \qquad (5)$$

For T>0, it is easy to see that the First-In-First-Out (FIFO), or equivalently Earliest Deadline First (EDF), scheduling policy minimizes the outage probability in this simple scenario. To characterize the diversity gain, the following two events to upper and lower bound the outage event are defined $$\mathcal{U}_d(n) \triangleq \left\{ \sum_{i=n-2T}^{n-T} Q(i) > C(T+1) \right\},$$

$$\mathcal{L}_d(n) \triangleq \{Q(n-T) > C(T+1)\}.$$

In the steady state, i.e., when $n \to \infty$, shown in [8]

$$Pr(L_d(n)) \leq P_P(\text{outage}) \leq Pr(U_d(n)).$$

Further $$\lim_{C \to \infty} -\frac{\log Pr(\mathcal{L}_d)}{C \log C} = \lim_{C \to \infty} -\frac{\log Pr(\mathcal{U}_d)}{C \log C} = (1+T)(1-\gamma).$$

Combining these two relationships results in the diversity gain expression:

$$d_P(\gamma) = (1+T)(1-\gamma).$$

In a more general case, $T_{q(n)}$, $0 \leq q \leq Q(n)$, $n>0$ is a sequence of i.i.d. nonnegative integer-valued random variables defined over a finite support $T_{min}$, $T_{min}+1$, ..., $T_{max}$. First, consider the scenario in which probability mass function (PMF) of $T_{q(n)}$ does not scale with C and establish the critical dependence of the achievable diversity gain on $T_{min} > 0$.

Lemma 2.

Let the PMF of $T_{q(n)}$ be given by $$Pr(T_{q(n)} = k) \triangleq \begin{cases} p_k, & T_{min} \leq k \leq T_{max}, \\ 0, & \text{otherwise,} \end{cases} \qquad (6)$$

and the probabilities $p_k$'s are constants that do not depend on C. Then, $$d_P(\gamma) = (1 + T_{min})(1-\gamma).$$

Proof:

A lower bound on the outage probability can be obtained by considering only the fraction of the requests corresponding to $T_{min}$ whereas an upper bound can be obtained by making $T_{q(n)} = T_{min}$ $\forall q(n)$. Both bounds have the same decay rate corresponding to the stated diversity advantage.

It is clear that the diversity gain of random T scenario is dominated by the requests with $T = T_{min}$, and hence, under the previous assumptions the system does not experience any prediction diversity gains when $T_{min} = 0$.

When the fraction of requests corresponding to $T_{min}$ decays as C grows, which is reasonable to expect in many emerging applications as most of the new demand corresponds to predictable and delay tolerant data traffic, then the proactive resource allocation framework is able to harness improved prediction diversity gains. This can be viewed as follows. To illustrate the idea, assume that $T_{min} = 0$ and $p_{T_{min}} = p_0 = C^{-\alpha}$, $\alpha > 0$, then the diversity gain of the predictive network is, $$d_P(\gamma) = 1 + \alpha - \gamma \qquad (7)$$

as long as $1+\alpha-\gamma$ is smaller than $2(1-\gamma)$ or equivalently, $\alpha \leq 1-\gamma$. Otherwise, the diversity gain is determined by the requests with T=1 and is given by $$d_P(\gamma) = 2(1-\gamma). \qquad (8)$$

This argument is extended in [8] for more general distributions of the look-ahead time T.

The proactive resource allocation paradigm significantly enhances the prediction diversity gain under the assumption of perfect, i.e., error free, prediction. The effect of prediction error on the prediction diversity gain may be quantified. Consider the deterministic T scenario, and assume that the traffic of the non-predictive system is characterized by the process Q(n), n>0 which represents the number of arriving requests at the beginning of time slot n with T=0. This process is Poisson with rate $C^\gamma$. Moreover, the system is operating according to the Shortest Deadline First scheduling policy. The model differentiates between the following two prediction error events.

The network mistakenly predicts a request and serves it resulting in an increase in the traffic load.

The predictive network fails to predict a request and, as a consequence, it encounters an urgent arrival with $T_{q(n)} = 0$.

Therefore, the arriving requests $Q^E(n)$, n>0 can be regarded as the superposition of two arrival processes: 1) Q'(n) corresponding to the predicted request at the beginning of time slot n with deadline n+T; and 2) Q"(n) corresponding to the urgent requests arriving requests at the beginning of time slot n and must be served instantaneously. The judicious design of the prediction algorithm aims to strike the optimal balance between these two events. This point is illustrated in the following special case: Q'(n) is Poisson with rate $C^{\gamma'}$, where $\gamma' \in \mathfrak{R}$, and Q"(n) is Poisson with rate $C^{\gamma''}$, $\gamma'' \leq \gamma$ such that $$C^{\gamma'} + C^{\gamma''} \geq C^\gamma. \qquad (9)$$

The constraint $\gamma'' \leq \gamma$ follows directly from the fact that the arrival rate of the urgent requests cannot exceed the arrival rate of requests in the error free scenario. On the other hand, the constraint (9) reflects the fact prediction errors can only increase the arrival rate. In this model, a necessary and sufficient condition for perfect prediction is $\gamma' = \gamma$ and $\gamma'' = -\infty$ resulting in $Q^E(n) = Q'(n) = Q(n+T)$. The lookahead time T is a function of $(\gamma', \gamma'')$ reflecting the fact that more aggressive prediction algorithms result in a larger T at the expense of introducing larger prediction errors. Finally, assume that, given $\gamma'$ and $\gamma''$, both processes Q'(n) and Q"(n) are independent.

By setting $\gamma'=a'\gamma$ and $\gamma''=a''\gamma$, the diversity gain of the predictive network will be given by $$d_P(\gamma)=\min\{(1+T(\alpha',\alpha''))(1-\max\{\alpha',\alpha''\}\gamma),1-''\gamma\}. \quad (10)$$

If $\max\{\alpha', \alpha''\}=\alpha''$ the diversity of the predictive network becomes $d_P(\gamma)=1-\alpha''\gamma$. However, since $\alpha''\leq 1$ and from (9), $\max\{\alpha', \alpha''\}=\alpha''$ if and only if $\alpha'=\alpha''=1$ corresponding to the scenario where the predictive mechanism is useless. Therefore, in the following case where $\alpha'\geq\alpha''$ in which case the prediction diversity gain is given by $$d_P(\gamma)=\min\{(1+T(\alpha',\alpha''))(1-\alpha'\gamma),1-\alpha''\gamma\} \quad (11)$$

implying that the predictive system achieves a strictly improved diversity gain over the non-predictive system if and only if, $$\min\{(1+T(\alpha',\alpha''))(1-\alpha'\gamma),1-\alpha''\gamma\}>1-\gamma. \quad (12)$$

An upper bound on the prediction diversity, for a given $(\alpha',\alpha'')$, corresponds to case where the optimum operating point for the two quantities inside the $\min\{.\}$ are equal, i.e., $$(1 + T(\alpha', \alpha''))(1 - \alpha'\gamma) = (1 - \alpha''\gamma) \quad (13)$$

or $$T(\alpha', \alpha'') = \frac{(\alpha' - \alpha'')\gamma}{1 - \alpha'\gamma}. \quad (14)$$

Hence, for a given $(\alpha',\alpha'')$, a prediction algorithm that achieves (14) is optimal in terms of the achievable prediction diversity and there is no benefit in increasing T further. Based on that, the achievability of prediction diversity gains hinges on the existence of prediction algorithms that satisfy the following necessary conditions $$1 \leq \alpha' \leq \frac{1}{\gamma}, \quad (15)$$

$$\alpha'' < 1 \quad (16)$$

Figure 2:
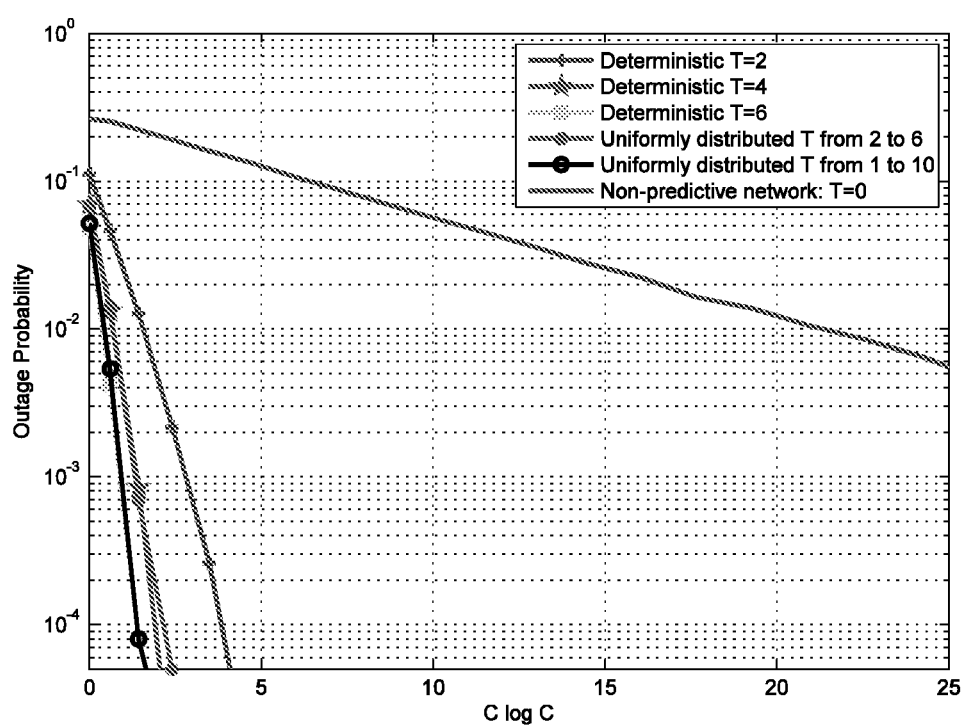
FIG. 2 is a plot of the outage probability of predictive and non-predictive networks versus C log C with $\gamma=0.8$.

At this point, the previous model for prediction errors illustrates the tradeoff between the two types of error events identified earlier. More accurate models may be developed that reflect the nature of the traffic requests and the dynamics of the employed prediction algorithms. Referring to FIG. 2, an outage probability of predictive and non-predictive networks vs. C log C with $\gamma=0.8$ is shown. Numerical results illustrate the performance gain offered by the proposed proactive resource allocation framework. The simulation is based on the EDF policy with $\gamma=0.8$. At each value of C, the system is simulated for $10^3$ time slots and the performance is averaged over $10^2$ simulation runs. It is clear, from the results, that there is a remarkable reduction in the resources required to attain a certain level of outage probability when the network employs the predictive resource allocation mechanism.

Moreover, for the two simulated random T scenarios, although $T_{min}$ is chosen to be 2 and 1, the corresponding outage probability curves are upper bounded by the outage probability of the predictive case with deterministic $T=2$. This actually may be a consequence of the small values of C in FIG. 2. Here, the averaging effect over the range between $T_{min}$ and $T_{max}$ appears to have a more favorable impact on the performance than increasing $T_{min}$.

Figure 3:
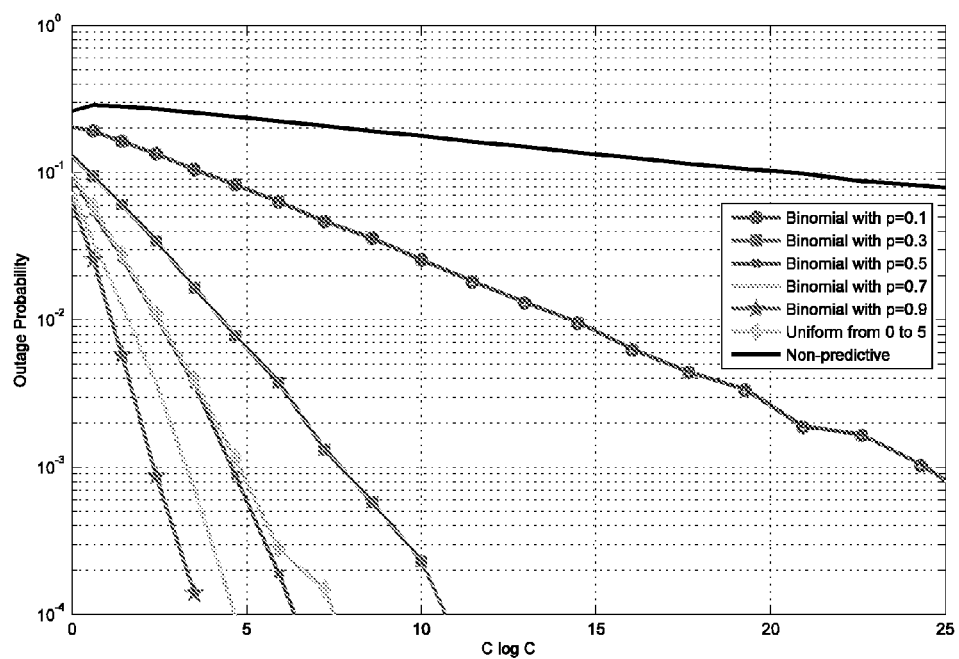
FIG. 3 is a plot of the effect of different distributions T on the outage performance ($\gamma=0.9$).

Referring to FIG. 3, an effect of different distributions T on the outage (blocking) performance ($\gamma=0.9$) is shown. A class of binomial distributions with finite support from $T_{min}=0$ to $T_{max}=5$ and parameter p is considered. That is, $$Pr(T = t) = p_t = \binom{T_{max}}{t}p^t(1 - p)^{T_{max}-t}$$

where $T_{min}\leq t\leq T_{max}$. The predictive system is then simulated for different values of p and the outage probability results are depicted. Moreover, the uniform distribution of T over the interval in=0 to $T_{max}=5$ is plotted on the same FIG. 3. From the results, the outage performance is sensitive to the value of $p_{T_{min}}$ over the simulated range of C. Since the binomial distributions of T, $p_{T_{min}}$ is monotonically decreasing with p and thus, as the weight of the arrivals with T=0 increases the outage behavior becomes worse although all of the outage curves have the same diversity gain in infinite C asymptotic. Also, in case of a uniform distribution, the outage probability curve is quite close to that of the binomial distribution with p=0.5 although $p_{T_{min}}$ of the uniform is larger than its peer of the binomial with p=0.5. The reason behind this behavior is that the weights of the higher values of T in case of the uniform distribution are larger than their peers in case of the binomial distribution with p=0.5. This advantage enables the scheduler to efficiently reduce the outage probability despite the relatively large probability corresponding to T=0 in the uniformly distributed T.

The previous example embodiment demonstrates the potential gains that can be leveraged from the proactive resource allocation framework when all the requests belong to the same class of QoS. In another example embodiment, a network has two QoS classes that can be considered as primary and secondary users sharing the same resources. The effect of prediction by the primary user only on the prediction diversity gain of the secondary network is evaluated. Clearly, the analysis can be extended to allow for prediction by the secondary user as well; but the example is limited to this special case for simplicity. It is assumed that the number of secondary arrivals at the beginning of time slot n is $Q^s(n)$, where $Q^s(n)$ follows a Poisson distribution with rate $\lambda^s=C^{\gamma^s}$, $0\leq\gamma^s\leq 1$. The number of primary requests arriving at the beginning of time slot n is $Q^p(n)$ that follows a Poisson distribution with rate $\lambda^p=C^{\gamma^p}$, where $0\leq\gamma^p\leq 1$. It is assumed that the system is dominated by primary arrivals, that is, $\lambda^p>\lambda^s$ or, equivalently, $\gamma^p>m\alpha^s$. The secondary and primary arrival processes are ergodic and independent.

The outage probability of the secondary user and its diversity gain when the primary user is non-predictive is analyzed. At the beginning of time slot n, the system is supposed to witness $Q^p(n)+Q^s(n)$ arriving requests with deadline is slot n, i.e., must be served in the same slot of arrival. The primary system has a fixed capacity C per slot. In order to enhance the utilization of its resources, the primary user allows secondary requests to be served by the remaining resources from serving the primary requests. Thus, at slot n, the remainder of $C-Q^p(n)$ is assigned to serve the secondary requests. The following result characterizes the achievable diversity gain in this scenario.

Theorem 3.

In the non-predictive scenario, the primary and secondary diversity are equal and given by $$d_N^s(\gamma^p,\gamma^s)=d_N^p(\gamma^p,\gamma^s)=1-\gamma^p. \quad (17)$$

Proof:

The outage probability of the primary system $P_N^p$(outage) is identical to the one analyzed in the previous section. As a result, the primary diversity gain is given by $$d_N^p(\gamma^p,\gamma^s)=1-\gamma^p. \qquad (18)$$

The secondary system encounters an outage at a given slot when the remaining resources from serving the primary requests at this slot are less than the number of arriving secondary requests at the beginning of the same slot. Thus, if the primary network suffers an outage in a certain slot with at least one arriving secondary request, the secondary system goes in outage as well. The secondary system, consequently, encounters an outage at slot n if and only if $$Q^p(n)+Q^s(n)>C \text{ and } Q^s(n)>0.$$

If probability of the secondary network when the primary network is non-predictive is denoted by $P_N^s$(outage), hence $$P_N^s(\text{outage})=Pr(Q^p(n)+Q^s(n)>C,Q^s(n)>0). \qquad (19)$$

The two random variables $Q^p(n)+Q^s(n)$ and $Q^s(n)$ are dependent but their joint distribution can simply be obtained by transformation of variables. By setting $Y=Q^p(n)+Q^s(n)$ and $U=Q^s(n)$, the exact expression of $P_N^s$(outage) is $$P_N^s(\text{outage}) = Pr(Y > C, U > 0) \qquad (20)$$

$$= \sum_{y=C+1}^{\infty} \sum_{u=1}^{y} \frac{C^{\gamma^p(y-u)+\gamma^s u}}{(y-u)!u!} e^{-(C^{\gamma^p}+C^{\gamma^s})}.$$

The diversity gain of the secondary system coexisting with a non-predictive primary network is defined by $$d_N^s(\gamma^p,\gamma^s) \triangleq \lim_{C\to\infty} \frac{-\log P_N^s(\text{outage})}{C \log C}.$$

For large values of C, the outer sum of the right hand side of (20) is dominated by $y=C+1$. However, the inner sum is not dominated by a single value of u because of $(y-u)! u!$ in the denominator. Consequently, as $C \to \infty$, $P_N^s$(outage) can be written as $$P_N^s(\text{outage}) \doteq \sum_{u=1}^{C+1} \frac{C^{\gamma^p(C+1-u)+\gamma^s u}}{(C+1-u)!u!} e^{-(C^{\gamma^p}+C^{\gamma^s})}. \qquad (21)$$

Characterizing $d_N^s(\gamma^p,\gamma^s)$ from (21) is, however, difficult, so another approach is used based on the asymptotic behavior of upper and lower bounds on $P_N^s$(outage).

The upper bound on $P_N^s$(outage) is determined as follows. Since $Pr(\mathcal{A},\mathcal{B}) \leq Pr(\mathcal{A})$ with equality if and only if $A\mathcal{A} \subseteq \mathcal{B}$, then $$P_N^s(\text{outage}) \leq Pr(Q^p(n)+Q^s(n)>C). \qquad (22)$$

The random variable $Q^p(n)+Q^s(n)$ has a Poisson distribution with mean $C^{\gamma^p}+C^{\gamma^s}$. Then applying upper and lower bounds on $Pr(Q^p(n)+Q^s(n)>C)$ similar to that conducted with $Pr(Q(n)>C)$ in the proof of Theorem 1, the diversity gain of the secondary network when the primary network is non-predictive is lower bounded by $$d_N^s(\gamma^p,\gamma^s) = 1 - \max\{\gamma^p,\gamma^s\} \qquad (23)$$

$$= 1-\gamma^p. \qquad (24)$$

The event that there is at least one secondary arrival with a primary outage at slot n is considered a sufficient but not necessary condition on a secondary outage at slot n. That is, $$L_N^s(n) \triangleq \{Q^p(n)>C,Q^s(n)>0\}, n\to\infty.$$

Note the event $L_N^s(n)$ is not necessary for a secondary outage at slot n as there may be $Q^p(n)<C$ but $Q^s(n)>C-Q^p(n)$ which results in a secondary outage at slot n too.

Furthermore, at steady state, $Pr(L_N^s(n))$ becomes independent of n as both arrival processes, $Q^p(n)$ and $Q^s(n)$, are stationary, hence use $Pr(L_N^s)$ instead. Since $L_N^s(n)$ is a sufficient T condition for a secondary outage, then $P_N^s$(outage)$\geq Pr(L_N^s)$. Hence, $$P_N^s(\text{outage}) \geq Pr(Q^p(n) > C, Q^s(n) > 0) \qquad (25)$$

$$= Pr(Q^p(n) > C) \cdot Pr(Q^s(n) > 0) \qquad (26)$$

$$= Pr(Q^p(n) > C)(1 - C^{-\gamma^s}) \qquad (27)$$

Therefore $$\lim_{C\to\infty} \frac{-\log P_N^s(\text{outage})}{C \log C} \leq \lim_{C\to\infty} \frac{-\log Pr(Q^p(n) > C)}{C \log C} - \frac{\log(1-C^{-\gamma^s})}{C \log C},$$

yielding $$d_N^s(\gamma^p,\gamma^s) \leq 1-\gamma^p. \qquad (28)$$

From (24), (28), it follows that $$d_N^s(\gamma^p,\gamma^s)=1-\gamma^p. \qquad (29)$$

Hence, the diversity gain of the secondary network in a primary non-predictive mode is the same as the diversity gain of the primary network although the arrival rate of secondary requests is strictly smaller than the primary arrival rate.

In this case, the system predicts the primary arrivals by T time slots in advance. It is assumed that T is deterministic and fixed for all primary requests, i.e., the deadline for the primary requests $Q^p(n)$ is n+T. The system, however, is assumed to be non-predictive for the secondary requests, i.e., the deadline for the secondary requests $Q^s(n)$ is n. When the system dedicates all the per-slot capacity C to serve the primary requests, according to the EDF policy, secondary requests arriving at the beginning of time slot n are served if and only if C is strictly larger than the number of primary requests existing in the system at the beginning of this slot. Unfortunately, this service policy does not enhance the outage performance of the secondary system although it minimizes the outage probability of the primary. The main reason is the large variations in the number of served primary requests per slot that takes on values from 0 to C. These variations are quite close to the variations in the number of served primary requests per slot in case of non-predictive primary network.

Figure 4:
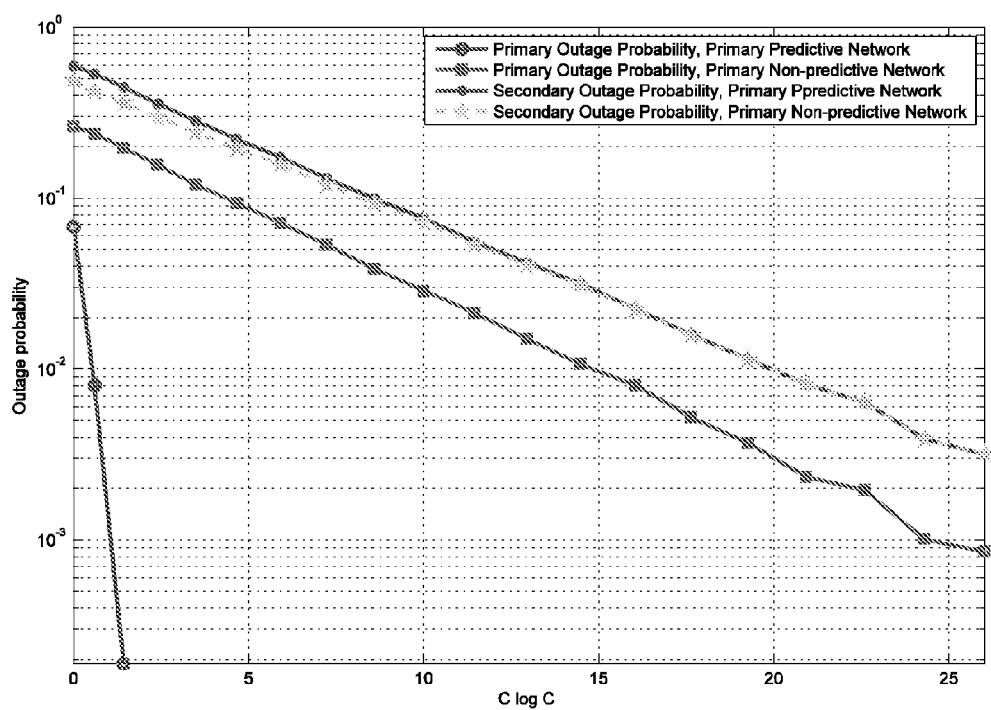
FIG. 4 is a plot of outage probability versus C log C for primary and secondary networks under two types of primary networks: predictive and non-predictive.

Referring to FIG. 4, a plot of outage probability vs. C log C for primary and secondary networks under the two types of primary network: predictive and non-predictive is shown. All are calculated assuming SP1 ($\gamma^p=0.75$, $\gamma^s=0.05$ and T=4).

The results are based on simulations over $M=10^3$ slots and averaging over 100 simulation runs. It is clear that the outage probability of the primary system when the primary network is predictive is significantly improved over its peer when the primary network is non-predictive. However, it can be noted that by selfishly minimizing the outage probability of the primary network, one does not leave room for enhancing the outage probability of the secondary network. In the following, two representative good citizen primary policies are described that result in significant gains in the secondary outage probability at a very marginal cost in terms of the primary outage.

The main idea motivating the first service policy is to minimize the probability of the dominant outage event instead of minimizing the overall outage probability. Thus, the diversity gain of the primary network is not affected while creating more opportunities for secondary requests. Consequently, the outage probability of the secondary network is enhanced at the same diversity gain of the primary network.

Service Policy 2 (SP2): The primary network is assigned a fixed capacity per slot of $C-\lfloor C^{\beta} \rfloor$ where $\beta<1$. It uses this fixed capacity to serve as much as possible of primary requests in the system according to the shortest deadline request policy.

Clearly SP2 achieves the optimal primary diversity advantage, i.e., $d_F^P(\gamma^P)=(1+T)(1-\gamma^P)$. Moreover, it is shown, numerically, in the following that the outage probability of the secondary network is improved because of the dedicated capacity of $\lfloor C^{\beta} \rfloor$. At this point, it is observed that SP2 allocates a fixed capacity per slot to the primary network. However, due to the variability of the arrival process, one may expect some performance gains if the service policy adaptively decides on the allocated capacity for the primary network based on the number of requests in the system at each slot and their deadlines. This intuition motivates the following policy.

Service Policy 3 (SP3): Let $N^P(n)$ be the number of the primary requests in the system at the beginning of time slot n, and $N_d^P(n)$ be the number of these requests whose deadline is slot n. Then, the capacity of the primary network at slot n is calculated as $$\min\{C, N_d^P(n) + f \times (N^P(n) - N_d^P(n))\}$$

where $0 \leq f \leq 1$. After that, the network serves the primary requests according to the EDF policy.

The performance of SP3 is highly dependent on the design parameter f. At f=0, the system, at steady state, is serving only the requests whose deadline is the current slot. In this case the system is similar to the non-predictive network in terms of primary and secondary outage probabilities. At f=1, the system is very selfish, and hence, achieving the optimal primary outage probability. The following numerical results, however, show that intermediate values for f result in significant improvement in the secondary outage while keeping the primary outage probability almost indistinguishable from the optimal one.

Figure 5:
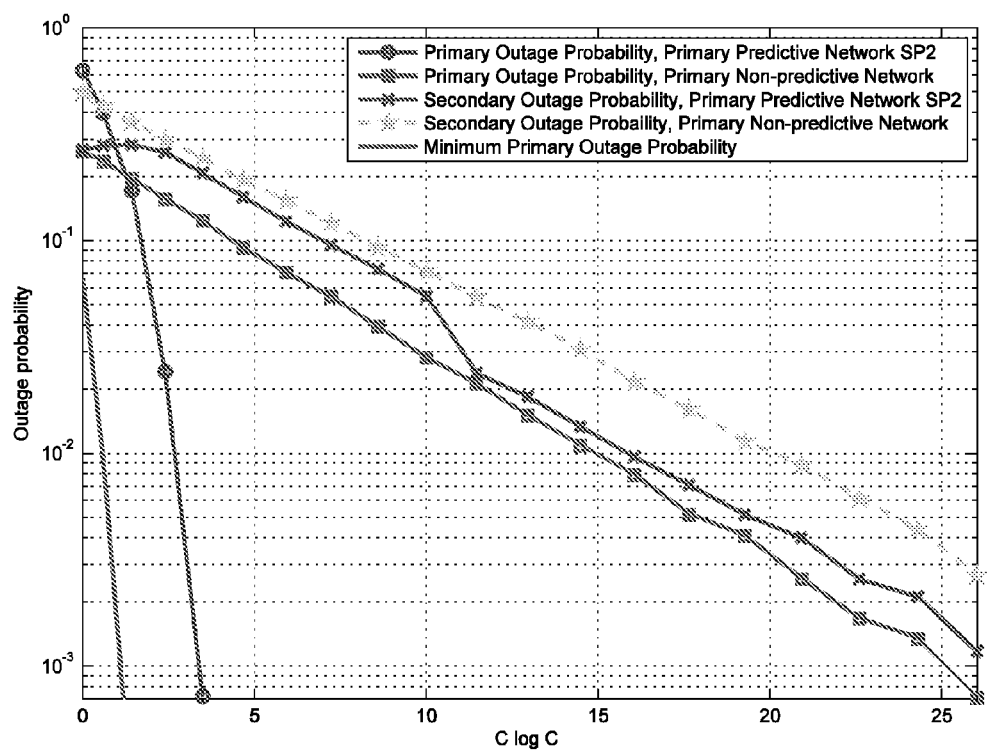
FIG. 5 is a plot of the outage probability of a primary network following SP2 with $\beta=0.3$.
Figure 6:
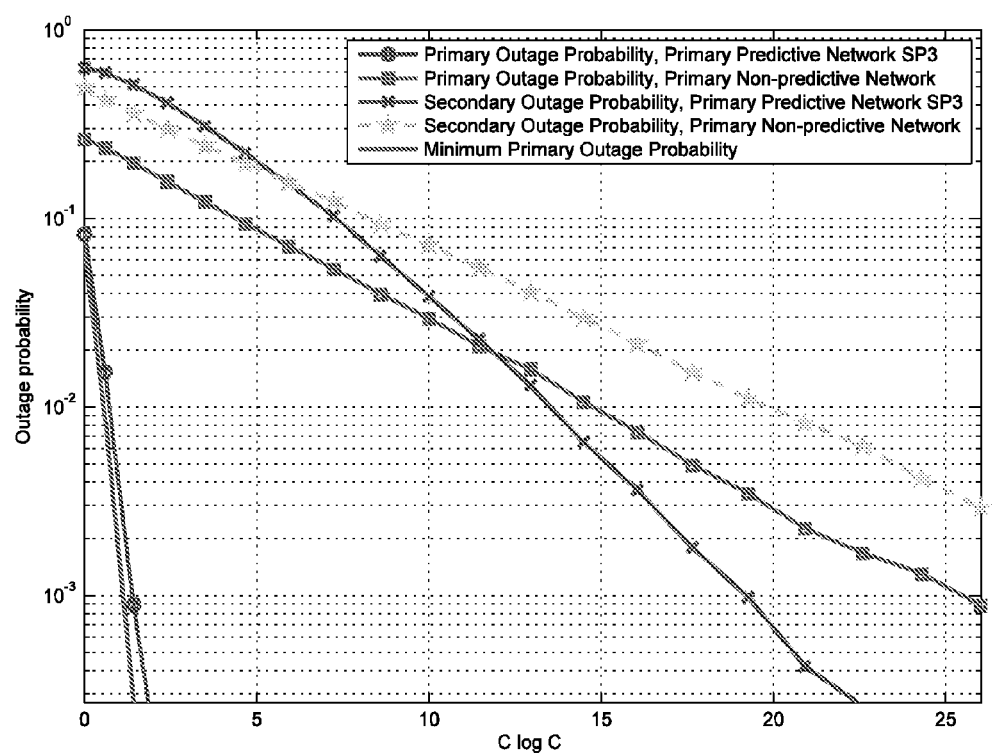
FIG. 6 is a plot of the outage probability of a primary network following SP3 with $f=0.5$.

The performance of a network with primary and secondary users has been evaluated numerically with the same parameters of FIG. 4 and the results are reported in FIGS. 5 and 6. In FIG. 5, a plot of outage probability vs. C log C of the primary and secondary users with $\gamma^P=0.75$, $\gamma^s=0.05$, T=4 and $\beta=0.3$ is shown. It is clear from FIG. 5 that the outage probability of the secondary network is enhanced over the non-predictive case. However, this improvement comes at the expense of shifting the outage probability curve of the primary network to the right while preserving the optimal diversity advantage. Moreover, although improved, the outage probability of the secondary network appears to have no gain in the decay rate (i.e., diversity).

In FIG. 6, a plot of outage probability vs. C log C. of the primary and secondary users with $\gamma^P=0.75$, $\gamma^s=0.05$, T=4 and f=0.5 is shown. Compared with SP2, the behavior of SP3 is shown to remarkably enhance the outage probability of the secondary user at an almost negligible loss in the primary outage performance. The prediction at the primary side does not only enhance the primary spectral efficiency, but it can be efficiently exploited to significantly improve the spectral efficiency of the coexisting non-predictive secondary users (networks) as well.

The present disclosure relates to a paradigm for resource allocation that exploits the predictability of user behavior to minimize the spectral resources (e.g., bandwidth) needed to achieve certain QoS metrics. Unlike the tradition reactive resource allocation approach, in which the network can only start serving a particular user request upon its initiation, the disclosed resource allocation approach anticipates future requests which allows the network more flexibility in scheduling those potential requests over an extended period of time. By adopting the outage (blocking) probability as the QoS metric, the proactive resource allocation framework may achieve significant spectral efficiency gains in several interesting scenarios. More specifically, the notion of prediction diversity gain may be used to quantify the gain offered by the proposed resource allocation algorithm under different assumption on the performance of the traffic prediction technique. Moreover, in a network with two QoS classes, prediction at one side only does not only enhance its diversity gain, but it also improves the outage probability performance of the other user.

In one embodiment, a smart phone application runs on the Android and/or the iPhone-iPad operating systems. In an alternative embodiment, the application executes at a server. This application uses machine learning techniques to build a profile for the smart phone user. This profile is used to build a list of anticipated requests by the user in the near future. The application locates nearby free (or authorized) Wi-Fi hotspots through the location information available from the GPS service and the Wi-Fi service (or any similar technique). When the smart phone or other user device is in the range of such hotspots, it automatically pre-fetches the date corresponding to the anticipated user requests. These data are cached in the local memory of the device and used later upon the initiation of the actual request by the user. The user benefits by: 1) lowering the amount of data it downloads from the network and the associated monthly cost; 2) enhancing the experience by reducing the probability of experiencing outages. The network also benefits because some of the peak data requests are rerouted via the Wi-Fi networks. Based on the user profile, the information refreshment rate and the local memory management technique are optimized. Finally, the application includes a recommendation system that makes the appropriate suggestions to the user based on the available data in the local memory, the user preferences (in terms to anticipated cost, data plan, etc. . . . ), and the current network conditions.

The previously described application is a representative implementation of the technology when both the supply and demand are variable. In this example, the varying supply corresponds to the probabilistic nature of the availability of Wi-Fi networks in the range of the smart phone or device. By predicting the future user demand, the disclosed system and method is able to facilitate a better matching between the supply and demand resulting in improving the welfare of both the network user and operator. It is worth noting that the application may be further optimized based on the context information available from the multitude of sensors and GPS incorporated in the smart device. Other operating systems (beyond Android, iPhone, and iPad) may be used to empower smart wireless or wired devices.

Therefore, while certain embodiments of the present invention are described in detail above, it is to be understood that the scope of the invention is not to be considered limited by such disclosure, and modifications are possible without departing from the spirit of the invention as evidenced by the following claims:

REFERENCES

[1] FCC Spectrum Policy Task Force Report, FCC 02-155. (November 2002).
[2] J. Mitola III, "Cognitive Radio: An Integrated Agent Architecture for Software Defined Radio" Doctor of Technology Dissertation, Royal Institute of Technology (KTH), Sweden, (May 2000).
[3] I. Akyildiz, W. Lee, M. Vuran, and S. Mohanty, "NeXt generation/dynamic spectrum access/cognitive radio wireless networks: A survey," *Computer Networks Journal* (Elsevier), (September 2006).
[4] S. A. Jafar, S. Srinivasa, I. Maric, and A. Goldsmith, "Breaking spectrum gridlock with cognitive radios: an information theoretic perspective", *Proceedings of the IEEE*, (May 2009).
[5] C. Song, Z. Qu, N. Blumm, A. Barabas, "Limits of Predictability in Human Mobility", *Science*, Vol. 327, pp. 1018-1021, (February 2010).
[6] R. G. Gallager, "Discrete Stochastic Processes", Kluwer, Boston, 1996.
[7] Peter W. Glynn, "Upper bounds on Poisson tail probabilities", *Operations Research Letters, Vol.* 6, pp. 9-14, (March 1987).
[8] H. El-Gamal, J. Tadrous, A. Eryilmaz, "Proactive Resource Allocation and Scheduling", in preparation for submission to IEEE Transactions on Information Theory.

What is claimed is:
1. A computerized method performed by a network server in communication with a mobile network comprising:
   (a) collecting from a mobile user device a plurality of prior requests from an individual user for user demand content from said network, said plurality of prior requests initiated by said mobile user device;
   (b) analyzing said plurality of prior requests for user demand content collected from said mobile user device with machine learning techniques to build a profile for said individual user;
   (c) generating a list of anticipated requests for user demand content from said individual user, said list comprising a deadline for each anticipated request;
   (d) for each anticipated request and deadline in said list:
      (1) downloading to said mobile user device in advance of said deadline data responsive to said anticipated request;
      (2) storing said data in a memory in said mobile user device;
   (e) receiving at least one actual request for user demand content from said individual user initiated by said mobile user device, and
   (f) in response to said at least one actual request for user demand content from said individual user, presenting at said mobile user device data from said memory response to said actual user request.

2. The computerized method of claim 1 wherein downloading to said mobile user device data responsive to each anticipated request in said list comprises downloading data according to a schedule of deadlines.

3. The computerized method of claim 2 wherein downloading data according to said schedule comprises establishing a timeslot for downloading said data in advance of said deadline for each anticipated request.

4. The computerized method of claim 1 wherein analyzing said plurality of prior requests for user demand content comprises analyzing a plurality of daily user requests.

5. The computerized method of claim 1 wherein downloading to said mobile user device in advance of said deadline data response to said anticipated request comprises downloading said data based on location information for said user device.

6. The computerized method of claim 5 wherein downloading occurs automatically when said location information identifies that said mobile user device is within range of a wireless network.

7. A computerized method performed by a network server in communication with a mobile network comprising:
   (a) collecting from a mobile user device a plurality of prior user requests sent from said mobile user device for data from said network;
   (b) generating a proactive schedule of anticipated requests for said mobile user device by analyzing said plurality of prior user requests collected from said mobile user device, said proactive schedule comprising a deadline for each anticipated request;
   (c) detecting at said mobile user device a node on said network for retrieving data responsive to at least one anticipated request on said proactive schedule;
   (d) collecting at said mobile user device location information, said location information identifying whether said mobile user device is in range of a wireless network;
   (e) for at least one of said anticipated requests on said proactive schedule:
      (1) downloading from a wireless network to said mobile user device in advance of said deadline data responsive to said anticipated request, said downloading automatically occurring when said location information identifies that said mobile user device is in range of said wireless network;
      (2) storing said data in a memory in said mobile user device; and (e)(f) in response to an actual user request for data, presenting at said mobile user device data from said memory responsive to said actual user request.

8. The computerized method of claim 7 wherein downloading data according to said proactive schedule comprises establishing a timeslot for downloading said data in advance of said deadline for each anticipated request.

9. The computerized method of claim 7 wherein generating said proactive schedule of anticipated requests for data by analyzing said plurality of prior user requests comprises analyzing a plurality of prior daily user requests.

10. A computerized method performed by a network server in communication with a mobile network comprising:
    (a) collecting from a mobile user device a plurality of prior user requests from an individual user for data from said network, said requests initiated by said mobile user device;
    (b) generating a list of anticipated requests for said mobile user device by analyzing said plurality of prior user requests collected from said mobile user device;

(c) generating a proactive schedule for downloading to a cache in said mobile user device data responsive to said anticipated requests according to anticipated arrivals of actual requests for said data;
(d) downloading said data to said cache in accordance with said proactive schedule, said downloading occurring automatically when said mobile user device is within range of a wireless network;
(e) storing said data in said cache;
(f) presenting at said mobile user device data from said cache responsive to said actual user request, and
(g) recommending data from said cache to said individual user, wherein said recommendation is made based upon network condition information and the data available in said cache.

11. The computerized method of claim 10 wherein said proactive schedule comprises expiration times for downloading said data to said cache.

12. The computerized method of claim 10 wherein said proactive schedule comprises deadlines for downloading said data to said cache.

13. The computerized method of claim 10 wherein downloading said data to said cache in accordance with said proactive schedule comprises downloading said data based on location information for said user device.

* * * * *